UNITED STATES PATENT OFFICE.

FRANZ KONRAD, OF NIEDERGRUND, AUSTRIA-HUNGARY.

PROCESS OF PREPARING BLANKS FOR THE MANUFACTURE OF HORN BUTTONS.

SPECIFICATION forming part of Letters Patent No. 545,079, dated August 27, 1895.

Application filed April 13, 1895. Serial No. 545,643. (No specimens.) Patented in Austria January 5, 1895, No. 45/31.

*To all whom it may concern:*

Be it known that I, FRANZ KONRAD, manufacturer, a subject of the Emperor of Austria-Hungary, residing at Niedergrund-on-the-Elbe, near Bodenbach, in the province of Bohemia, in the Empire of Austria-Hungary, have invented certain new and useful Improvements in the Process of Preparing Blanks for the Manufacture of Horn Buttons, (for which I have obtained patents in Austria, No. 43/31, dated January 5, 1895;) and I do hereby declare the following to be a full, clear, and exact description of the invention, such as will enable others skilled in the art to which it appertains to make and use the same.

My invention has relation to the manufacture of horn buttons, and more particularly to the preparation of the blanks from which such buttons are made in a well-known manner by stamping.

It has heretofore been the practice to flatten the hoofs of animals by compression, with a view to obtaining round disks from which the buttons are afterward cut. This method has the disadvantage that sharp edges are present, which when the blank is subsequently subjected to the stamping operation results in a button having a more or less rough rim that impairs its value. To avoid this it has been proposed to turn the flattened hoof-disks twice and to then polish the same in a tumbling-box. The result of the last-named process has been satisfactory; yet it requires a considerable plant and involves a large amount of labor.

The object of my invention is to avoid the disadvantages referred to; and this I accomplish by the provision of simple and cheap means at the disposal of every manufacturer of horn buttons, whereby I obtain an intermediate product or blank of a quality not attainable by the methods heretofore resorted to.

My improvement consists, essentially, in cutting the press-flattened hoofs into disks of substantially uniform thickness, which is done by simply removing the excess of material without paying any attention to the neatness of the work or the sharpness of the edges in contradistinction to the care heretofore necessary in these particulars. The rough disks are then boiled in a horn solvent—as, for instance, in an alkali, or in a caustic alkali lye, as soda or caustic soda-lye, or in a milk of caustic lime, or in a lye of a mixture of any two or more of these substances—the disks being boiled until the lye has destroyed the brittle nature of the horn to a suitable depth. The disks so prepared are then polished in any suitable manner, as in a tumbling-box, whereby horn disks or blanks having perfectly smooth surfaces and rounded edges are obtained ready for dyeing and of a quality equally as good if not superior to the blanks obtained by the best methods heretofore resorted to, while in my improved method of treatment a smaller percentage of inferior goods is produced than has been the case hitherto.

My improved method or process has the further advantage that the quantity of material required to be removed before subjecting the disks to the action of the solvent is reduced to a minimum—namely, not more than the strictly necessary quantity need be removed or cut off from the hoofs—so that hoofs from which only small buttons could heretofore be obtained, owing to the necessity of cutting such hoofs smooth and in view of the sharp edges resulting from this operation, will, owing to their subsequent treatment in accordance with my invention, produce much larger buttons. The same final product can therefore be obtained from less valuable materials, thereby greatly reducing the costs of such final product.

Having thus described my invention, what I claim as new therein, and desire to secure by Letters Patent, is—

1. The herein-described improvement in the manufacture of horn buttons, which consists in subjecting the flattened horn disks to the action of a horn solvent and then polishing said disks.

2. The herein-described improvement in the manufacture of horn buttons, which consists in boiling the press flattened horn disks in a horn solvent, as an alkali lye, and subsequently polishing said disks and rounding the edges thereof.

3. The herein-described improvement in the manufacture of horn buttons, which consists in boiling the press flattened horn disks in a horn solvent, as an alkali lye, and subsequently polishing said disks by subjecting the same to a tumbling operation.

In testimony whereof I affix my signature in presence of two witnesses.

FRANZ KONRAD.

Witnesses:
   EDUARD SHIRBY,
   FREICORT.